(12) United States Patent
Velasquez et al.

(10) Patent No.: US 12,472,705 B2
(45) Date of Patent: Nov. 18, 2025

(54) METHODS FOR CONFIGURING A SHAPE OF A TOOL AND ASSOCIATED SYSTEMS AND METHODS FOR MANUFACTURING A COMPOSITE STRUCTURE

(71) Applicant: The Boeing Company, Chicago, IL (US)

(72) Inventors: Luis F. Velasquez, Ladson, SC (US); Allen J. Halbritter, Summerville, SC (US)

(73) Assignee: The Boeing Company, Arlington, VA (US)

( * ) Notice: Subject to any disclaimer, the term of this patent is extended or adjusted under 35 U.S.C. 154(b) by 112 days.

(21) Appl. No.: 17/711,194

(22) Filed: Apr. 1, 2022

(65) Prior Publication Data
US 2023/0311431 A1 Oct. 5, 2023

(51) Int. Cl.
*B29C 64/00* (2017.01)
*B29C 35/02* (2006.01)
*B29C 70/44* (2006.01)

(52) U.S. Cl.
CPC ............. *B29C 70/44* (2013.01); *B29C 35/02* (2013.01)

(58) Field of Classification Search
None
See application file for complete search history.

(56) References Cited

U.S. PATENT DOCUMENTS

| | | | |
|---|---|---|---|
| 6,162,376 A * | 12/2000 | Mead | B29D 11/00413 264/2.7 |
| 7,237,408 B2 * | 7/2007 | Frank | C03B 23/03 65/289 |
| 8,936,695 B2 | 1/2015 | Rotter et al. | |
| 10,336,019 B2 | 7/2019 | Nelson et al. | |
| 2008/0027199 A1 * | 1/2008 | Mazurek | A61L 15/26 528/10 |
| 2009/0107312 A1 * | 4/2009 | Lewis | B32B 3/02 83/76.1 |
| 2014/0075996 A1 * | 3/2014 | Dannoux | C03B 23/0256 65/273 |
| 2014/0175704 A1 * | 6/2014 | Eberdt | B29C 70/48 264/319 |
| 2014/0360665 A1 * | 12/2014 | Tupper | B32B 37/14 156/349 |
| 2017/0014891 A1 * | 1/2017 | Cott | B21D 35/002 |
| 2022/0118501 A1 * | 4/2022 | Ren | G06F 30/17 |

OTHER PUBLICATIONS

Materials & Processes: Tooling for composites, https://www.compositesworld.com/articles/tooling, (2016). (Year: 2016).*
The Study of Thermal, Mechanical and Shape Memory Properties of Chopped Carbon Fiber-Reinforced TPI Shape Memory Polymer Composites, Section 1, Wang et al., https://www.mdpi.com/2073-4360/9/11/594, (2017). (Year: 2017).*

(Continued)

*Primary Examiner* — Nicholas R Krasnow
(74) *Attorney, Agent, or Firm* — Walters & Wasylyna LLC (57) ABSTRACT

A method for configuring a shape of a tool from an initial shape to a reconfigured shape includes localized heating a portion of the tool to yield a heated portion of the tool and mechanically manipulating the heated portion of the tool to achieve the reconfigured shape.

20 Claims, 6 Drawing Sheets

(56) References Cited

OTHER PUBLICATIONS

Porous Shape Memory Polymers, Hearon et al., Section 3.3., https://www.ncbi.nlm.nih.gov/pmc/articles/PMC3639501/, (2014). (Year: 2014).*
https://www.alexjfischer.com/what-is-roboforming/ (Year: 2013).*
https://web.archive.org/web/20170124105144/http://www.alexjfischer.com/what-is-roboforming/ (Year: 2013).*
Kim, S.W., Lee, Y.S., Kang, S.H. and Lee, J.H., 2007. Incremental forming of Mg alloy sheet at elevated temperatures. Journal of Mechanical Science and Technology, 21, pp. 1518-1522. (Year: 2007).*
Afonso, D., De Sousa, R.A., Torcato, R. and Pires, L., 2019. Incremental forming as a rapid tooling process. Berlin: Springer International Publishing. (Year: 2019).*
https://www.iso.org/obp/ui/#iso:std:iso:8373:ed-3:v1:en.*

\* cited by examiner

METHODS FOR CONFIGURING A SHAPE OF A TOOL AND ASSOCIATED SYSTEMS AND METHODS FOR MANUFACTURING A COMPOSITE STRUCTURE

FIELD

The present disclosure is generally related to manufacturing composite structures and, more particularly, to methods for configurating a shape of a tool and associated systems and methods for manufacturing composite structures.

BACKGROUND

Manufacturing composite structures typically includes draping composite material over a tool or mandrel prior to curing to a shape. Existing materials used for morphable tools and mandrels are limited in that they do not have the ability of being both rigid and completely vacuum tight. Existing tools that can morph contours are typically made from soft and flexible materials. Further, existing morphable molds that are rigid typically have slits or cuts on their surface to allow for flexibility of the part along the length, and thus are not vacuum tight.

Accordingly, those skilled in the art continue with research and development efforts in the field of improving methods and systems for manufacturing composite structures.

SUMMARY

The following is a non-exhaustive list of examples, which may or may not be claimed, of the subject matter according to the present disclosure.

Disclosed are methods for configuring a shape of a tool from an initial shape to a reconfigured shape.

In an example, the method includes localized heating a portion of the tool to yield a heated portion of the tool and mechanically manipulating the heated portion of the tool to achieve the reconfigured shape.

Also disclosed are methods for manufacturing a composite structure.

In an example, the method includes localized heating a portion of a tool to yield a heated portion of the tool, mechanically manipulating the heated portion of the tool to change a shape of the tool from an initial shape to a reconfigured shape, and positioning composite material on an outside surface of the tool to yield a composite layup.

Other examples of the disclosed systems, apparatuses, and methods will become apparent from the following detailed description, the accompanying drawings, and the appended claims

DETAILED DESCRIPTION

The following detailed description refers to the accompanying drawings, which illustrate specific examples described by the present disclosure. Other examples having different structures and operations do not depart from the scope of the present disclosure. Like reference numerals may refer to the same feature, element, or component in the different drawings.

Illustrative, non-exhaustive examples, which may be, but are not necessarily, claimed, of the subject matter according to the present disclosure are provided below. Reference herein to "example" means that one or more feature, structure, element, component, characteristic, and/or operational step described in connection with the example is included in at least one aspect, embodiment, and/or implementation of the subject matter according to the present disclosure. Thus, the phrases "an example," "another example," "one or more examples," and similar language throughout the present disclosure may, but do not necessarily, refer to the same example. Further, the subject matter characterizing any one example may, but does not necessarily, include the subject matter characterizing any other example. Moreover, the subject matter characterizing any one example may be, but is not necessarily, combined with the subject matter characterizing any other example.

Figure 1:
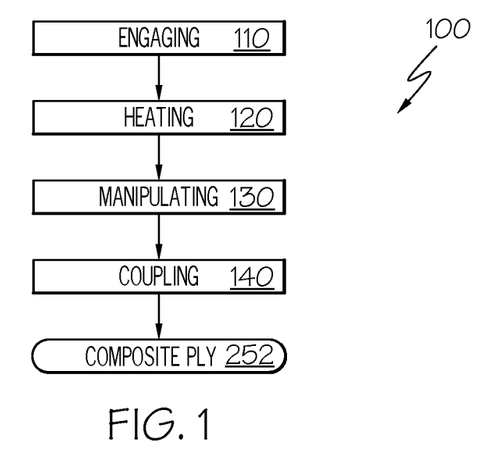
FIG. 1 is a flow diagram of a method for configuring a shape of a tool from an initial shape to a reconfigured shape.
Figure 3:
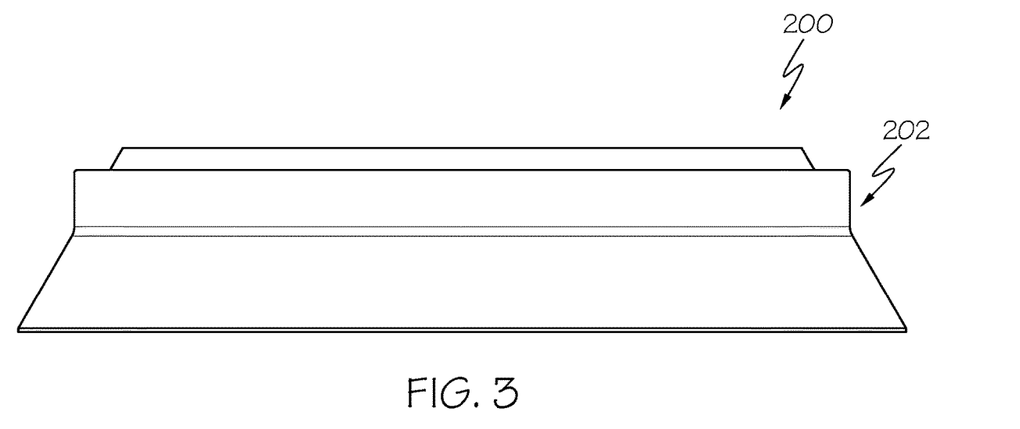
FIG. 3 is a perspective view of a tool in an initial shape.
Figure 4:
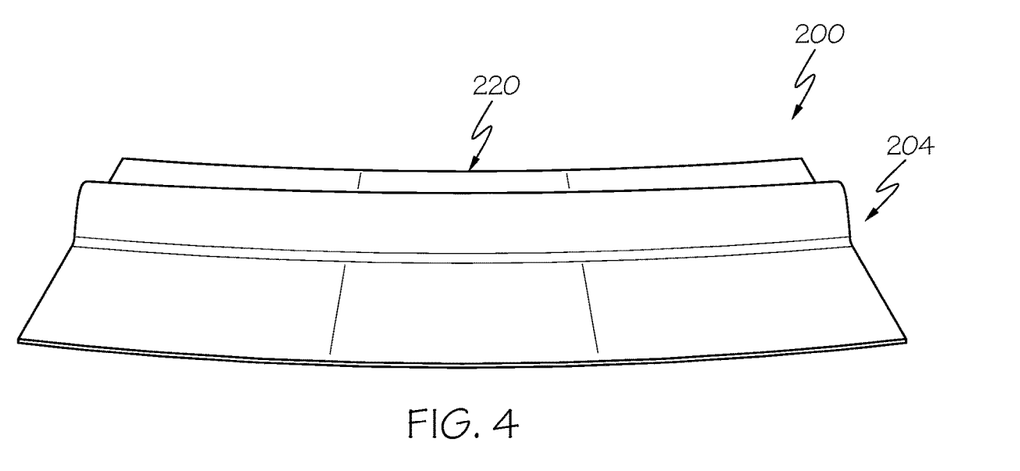
FIG. 4 is a perspective view of a tool in a reconfigured shape.

Referring to FIG. 1, disclosed is a method 100 for configuring a shape of a tool 200 from an initial shape 202, see FIG. 3, to a reconfigured shape 204, see FIG. 4. This disclosed method 100 is useful for forming un-cured composite stringers/stiffeners of varying contours with a tool 200 that may be manipulated to any shape. The tool 200 is an impermeable mold that is configured morph to varying contours via an automated apparatus that can control the morphing of the tool 200 to a particular desired geometry while maintaining a solid and vacuum tight overall surface. The vacuum integrity of the tool 200 is designed for drawing a vacuum to hold a composite ply 252 against the tool 200.

The tool 200 may include any material having requisite material properties for maintaining desired vacuum draw against the tool 200, as well as ability to reconfigure to a desired shape. In one example, the tool 200 includes a thermoset material. In another example, the tool 200 includes a composite material. In another example, the tool 200 comprises a material that is rigid at temperatures below about 150° F. and is flexible at temperatures at and above about 150° F. In yet another example, the tool 200 is impermeable to air. For example, the tool 200 may be a single, monolithic structure such that the entire surface area of the tool 200 is planar and does not include any discontinuities, thus it is impermeable to air.

The tool 200 may have any shape or configuration for the desired composite structure. In one example, the tool 200 is in the shape of an aerospace component. In another example, the tool 200 is in the shape of a stringer.

Referring back to FIG. 1, in one or more examples, the method 100 includes localized heating 120 a portion of the tool 200 to yield a heated portion 220 of the tool 200. In one example, the localized heating 120 comprises heating the portion of the tool 200 to about 125° F. to about 200° F. In another example, the localized heating 120 comprises heating the portion of the tool 200 to about 140° F. to about 175°

F. In another example, the localized heating 120 includes heating the portion of the tool 200 to about 150° F.

The localized heating 120 may include heating less than 100 percent of a total volume of the tool 200. In one example, the localized heating 120 includes heating less than 50 percent of a total volume of the tool 200. In another example, the localized heating 120 includes heating less than 25 percent of a total volume of the tool 200. In another example, the localized heating 120 includes heating less than 15 percent of a total volume of the tool 200.

Figure 5:
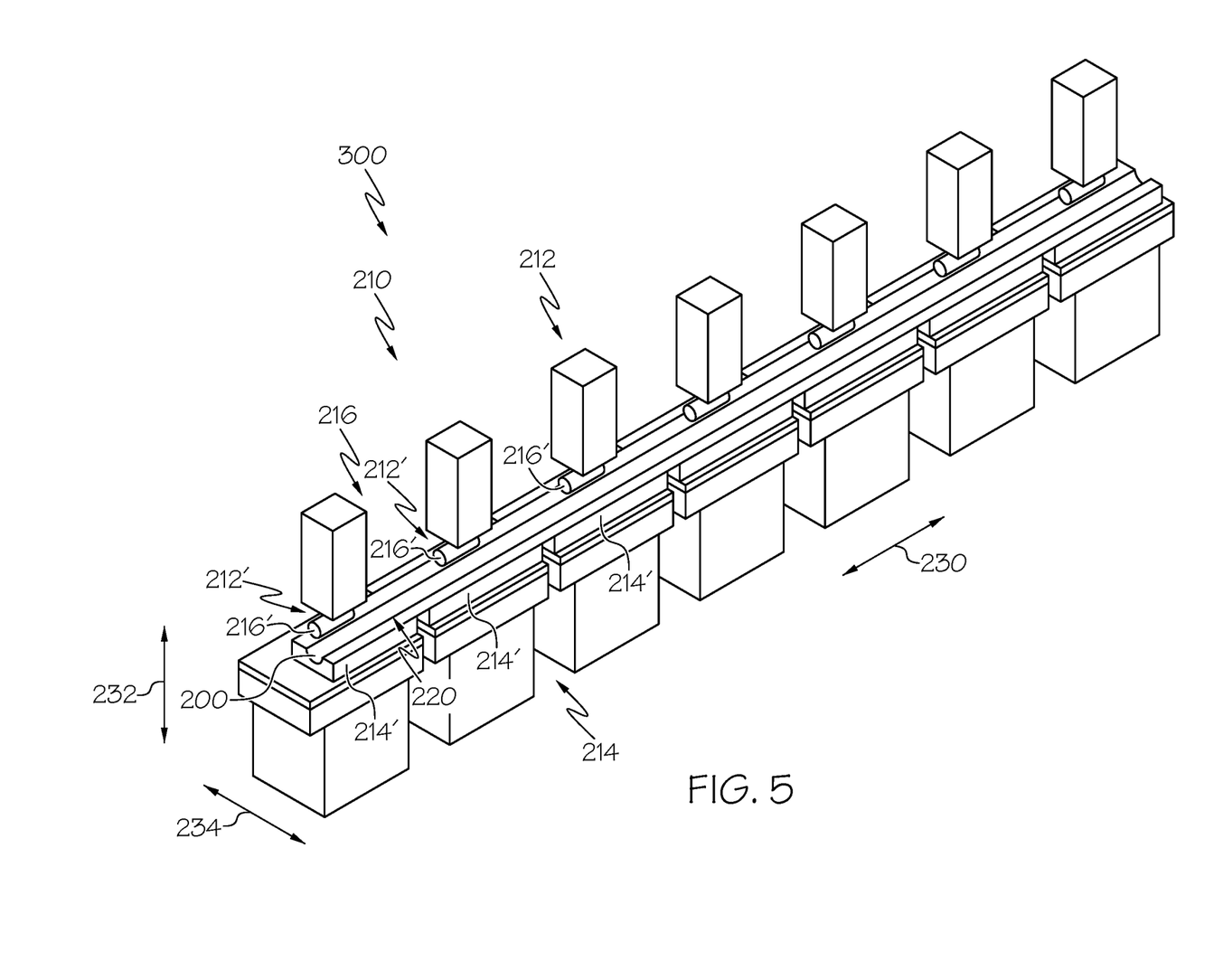
FIG. 5 is a perspective view of a system for manufacturing a composite structure.

The localized heating 120 may include heating with a shaping machine 210, see FIG. 5. The shaping machine 210 may include a plurality of heat sources 214. Each heat source 214' of the plurality of heat sources 214 may be individually controllable such that each heat source 214' may be heated to a different temperature and may be heated at different times. Further, each heat source 214' may include a heating element. In one example, each heat source 214' supplies heat via convection hot air. In another example, each heat source 214' supplies heat via a localized heating pad.

Referring to FIG. 1, in one or more examples, the method 100 further includes engaging 110 the shaping machine 210 with the tool 200. The plurality of automated shaping members 212 of the shaping machine 210 may be automated. Further, the plurality of automated shaping members 212 of the shaping machine 210 may be equidistantly spaced along the longitudinal axis 230. Further, in one or more examples, the plurality of automated shaping members 212 may be independently movable about one or more of a longitudinal axis 230, a vertical axis 232, and a traverse axis 234. Further, each automated shaping member 212' of the plurality of automated shaping members 212 may be rotatable about one or more of the longitudinal axis 230, the vertical axis 232, and the traverse axis 234. In yet another example, the plurality of automated shaping members 212 may be automated by computer numerical control.

Referring back to FIG. 1, in one or more examples, the method 100 further includes mechanically manipulating 130 the heated portion 220 of the tool 200 to achieve the reconfigured shape 204. In one example, the mechanically manipulating 130 comprises manipulating heated portion of the tool 200 with at least one automated shaping member 212' of a plurality of automated shaping members 212 of the shaping machine 210, see FIG. 5. Each automated shaping member 212' of the plurality of automated shaping members 212 includes a shaping feature 216'. Each shaping feature 216' of a plurality of shaping features 216 may be movable about more or more of the longitudinal axis 230, the vertical axis 232, and the traverse axis 234. Further, each shaping feature 216' of the plurality of shaping features 216 may be rotatable about one or more of the longitudinal axis 230, the vertical axis 232, and the traverse axis 234.

The mechanically manipulating 130 may be automated and may be achieved via any suitable means of reconfiguring the shape of the tool 200. In one example, the mechanically manipulating 130 includes gripping the heated portion 220 of the tool. In another example, the mechanically manipulating 130 includes expanding the heated portion 220 of the tool. In yet another example, the mechanically manipulating 130 includes suctioning the heated portion 220 of the tool. The method 100 may further include coupling 140 a composite ply 252, i.e. uncured composite material, with the tool 200 or a previously laid ply on the tool 200 to yield a composite layup 250.

Figure 2:
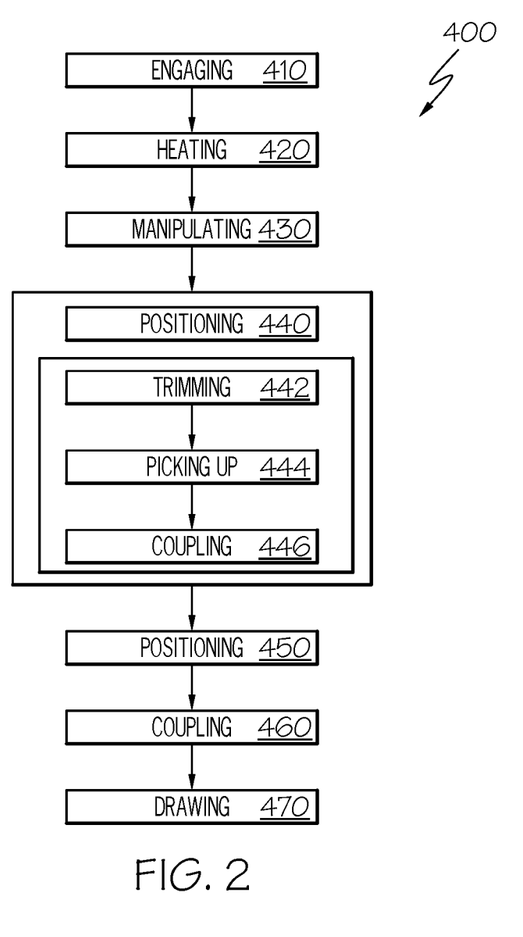
FIG. 2 is a flow diagram of a method for manufacturing a composite structure.

Referring to FIG. 2, disclosed is a method 400 for manufacturing a composite structure. In on example, the method 400 includes localized heating 420 a portion of a tool 200 to yield a heated portion 220 of the tool 200. The localized heating 420 may include heating with the shaping machine 210, see FIG. 5. The shaping machine 210 may include a plurality of heat sources 214. Each heat source 214' of the plurality of heat sources 214 may be individually controllable such that each heat source 214' may be heated to a different temperature and may be heated at different times. Further, each heat source 214' may include a heating element. In one example, each heat source 214' supplies heat via convection hot air. In another example, each heat source 214' supplies heat via a localized heating pad.

Still referring to FIG. 2, in one or more examples, the method 400 further includes engaging 410 a shaping machine 210 with the tool 200. In one example, the shaping machine 210 comprises a plurality of automated shaping members 212. The plurality of automated shaping members may be equidistantly spaced along the longitudinal axis 230. In another example, the plurality of automated shaping members 212 are independently movable about one or more of the longitudinal axis 230, the vertical axis 232, and the traverse axis 234. In yet another example, the plurality of automated shaping members 212 are automated by computer numerical control.

Referring to FIG. 2, the method 400 further includes mechanically manipulating 430 the heated portion 220 of the tool 200 to change a shape of the tool 200 from an initial shape 202 to a reconfigured shape 204. In one example, the mechanically manipulating 430 includes gripping the heated portion 220 of the tool. In another example, the mechanically manipulating 430 includes expanding the heated portion 220 of the tool. In yet another example, the mechanically manipulating 430 includes suctioning the heated portion 220 of the tool.

Still referring to FIG. 2, in one or more examples, method 400 further includes positioning 440 composite material on an outside surface of the tool 200 to yield a composite layup 250. In one or more examples, the positioning 440 includes trimming 442 composite material to form a composite ply 252 of the reconfigured shape 204, picking up 444 the composite ply 252, and coupling 446 the composite ply 252 with an outside surface of the tool 200 or on a previously laid ply on the tool 200 to yield a composite layup 250. The composite ply 252 maintains the reconfigured shape 204 during the picking up 444. For example, the picking up 444 may be achieved via vacuum draw to maintain the reconfigured shape 204.

The composite layup 250 includes at least one ply of composite material (e.g., a composite ply 252) placed on (e.g., over) the tool 200 or on a previously laid ply on the tool 200. The composite layup 250 can include any number (e.g., one or more) of composite plies. The composite material includes a reinforcement material embedded in a polymeric matrix material. In one or more examples, the composite material is pre-impregnated ("pre-preg") thermoset composite material.

The tool 200 may include any material having requisite material properties. In one example, the tool 200 includes a thermoset material. In another example, the tool 200 includes a composite material. In another example, the tool 200 comprises a material that is rigid at temperatures below about 150° F. and is flexible at temperatures at and above about 150° F. In yet another example, the tool 200 is impermeable to air. For example, the tool 200 may be a single, monolithic structure such that the entire surface area of the tool 200 is planar and does not include any discontinuities, thus it is impermeable to air.

The tool 200 may have any shape or configuration for the desired composite structure. In one example, the tool 200 is in the shape of an aerospace component. In another example, the tool 200 is in the shape of a stringer.

Figure 6:
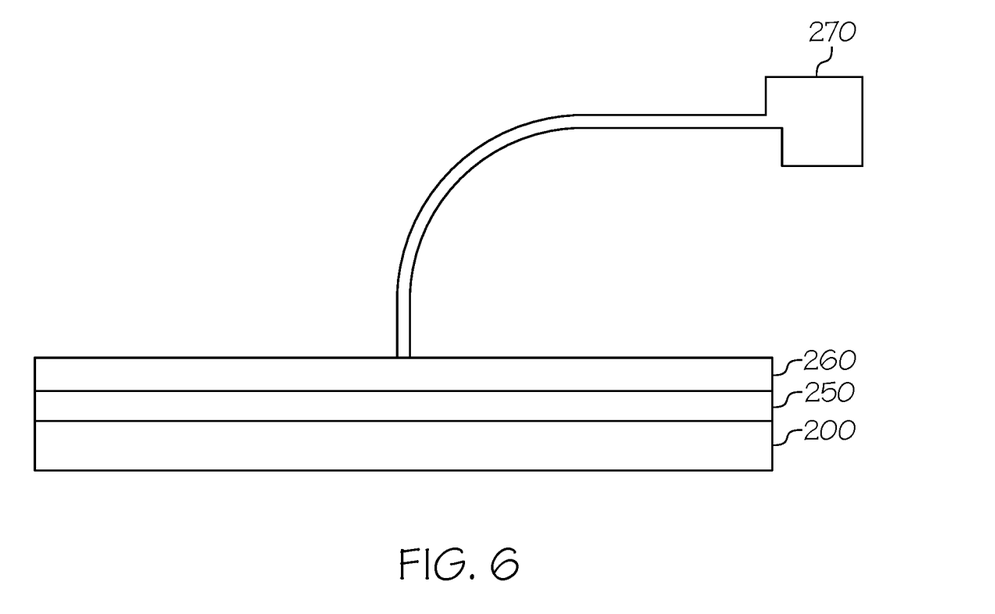
FIG. 6 is a cross-sectional schematic of a portion of a system for manufacturing a composite structure.

Referring back to FIG. 2, in one or more examples, the method 400 includes positioning 450 a vacuum bag 260 into engagement with the composite layup 250, coupling 460 a vacuum source 270 with the vacuum bag 260, and drawing 470 a vacuum from the vacuum bag 260, see FIG. 6. The drawing 460 may benefit from the tool 200 being impermeable to air such that a lower amount of vacuum may be drawn while effectively conforming the composite layup 250 to a shape of the tool 200. The vacuum bag 260 may include a flow media layer, such as a biplanar mesh, and an impermeable layer.

Referring to FIG. 5, disclosed is a system 300 for manufacturing a composite structure. The system 300 includes a tool 200 and a shaping machine 210 configured to manipulate the tool 200. The tool 200 is impermeable such that it is impermeable to air. The tool 200 is a single, monolithic structure and is impermeable across the entire surface area of the tool 200. In one example, the tool 200 comprises a thermoset material. In another example, the tool 200 includes a material that is rigid at temperatures below about 150° F. and is flexible at temperatures at and above about 150° F.

Referring to FIG. 5, the shaping machine 210 may include a plurality of heat sources 214. Each heat source 214' of the plurality of heat sources 214 may be individually controllable such that each heat source 214' may be heated to a different temperature and may be heated at different times. Further, each heat source 214' may include a heating element. In one example, each heat source 214' supplies heat via convection hot air. In another example, each heat source 214' supplies heat via a localized heating pad.

Still referring to FIG. 5, in one or more examples, the shaping machine 210 of the system 300 includes a plurality of automated shaping members 212. The plurality of automated shaping members 212 may be equidistantly spaced along the longitudinal axis 230. In one example, the plurality of automated shaping members 212 are independently movable about one or more of the longitudinal axis 230, the vertical axis 232, and the traverse axis 234. In another example, the plurality of automated shaping members 212 are automated by computer numerical control.

Each automated shaping member 212' of the plurality of automated shaping members 212 includes a shaping feature 216'. Each shaping feature 216' of a plurality of shaping features 216 may be movable about more or more of the longitudinal axis 230, the vertical axis 232, and the traverse axis 234. Further, each shaping feature 216' of the plurality of shaping features 216 may be rotatable about one or more of the longitudinal axis 230, the vertical axis 232, and the traverse axis 234.

Referring to FIG. 5 and FIG. 6, in one or more examples, system 300 includes a composite layup 250 positioned on an outside surface of the tool 200. The system 300 may further include a vacuum bag 260 positioned on the composite layup 250, see FIG. 6. The vacuum bag 260 may include a flow media layer, such as a biplanar mesh, and an impermeable layer. Further, the system 300 may include a vacuum source 270 in fluid communication with the vacuum bag 260.

Figure 7:
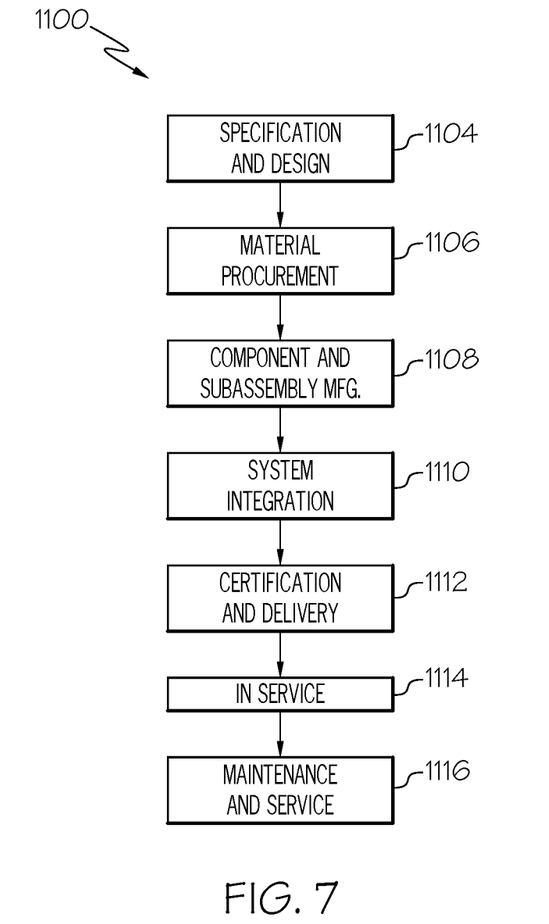
FIG. 7 is a flow diagram of an aircraft manufacturing and service methodology.
Figure 8:
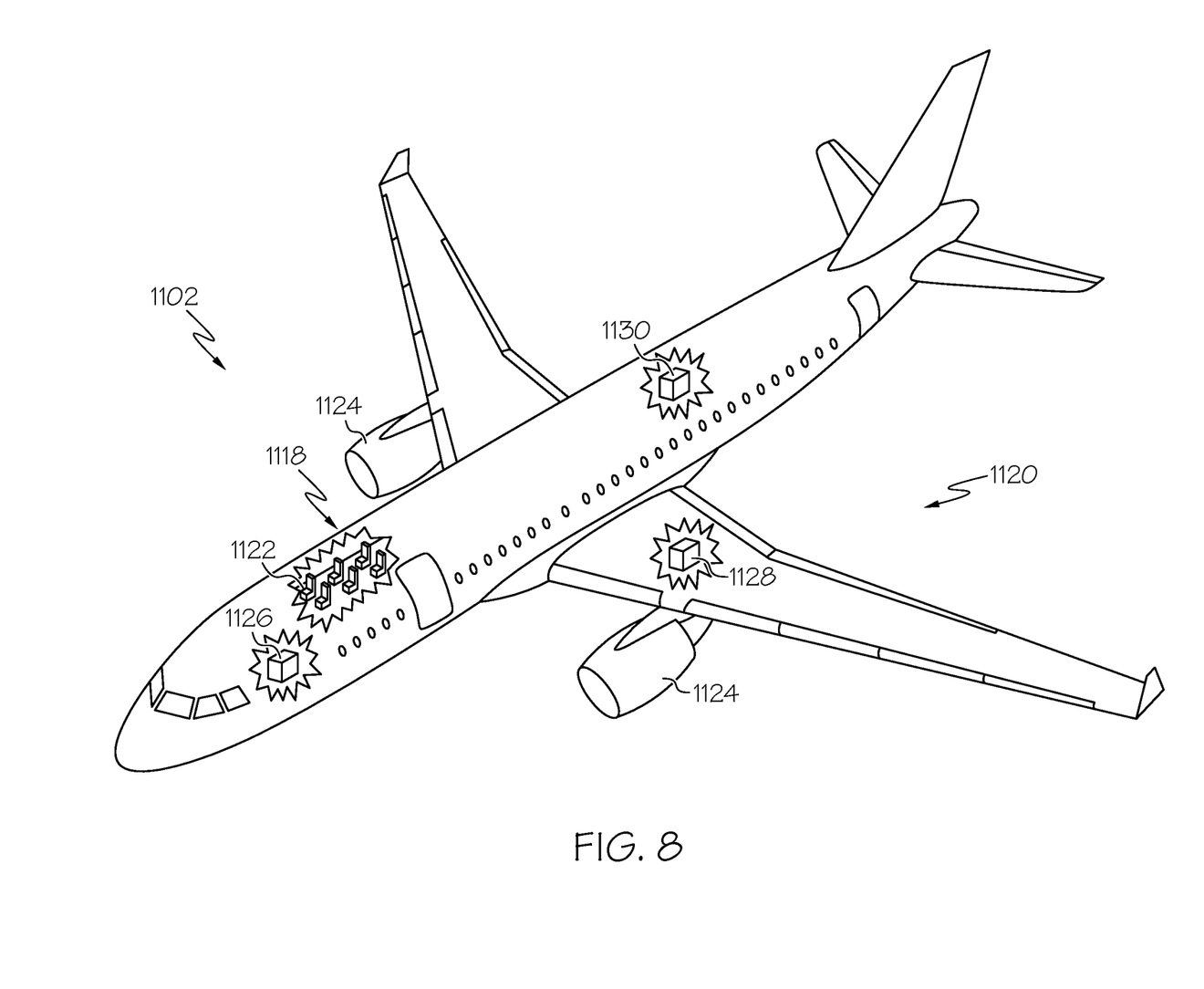
FIG. 8 is a schematic block diagram of an example of an aircraft.

Examples of the present disclosure may be described in the context of aircraft manufacturing and service method 1100 as shown in FIG. 7 and aircraft 1102 as shown in FIG. 8. During pre-production, service method 1100 may include specification and design (block 1104) of aircraft 1102 and material procurement (Block 1106). During production, component and subassembly manufacturing (Block 1108) and system integration (Block 1110) of aircraft 1102 may take place. Thereafter, aircraft 1102 may go through certification and delivery (Block 1112) to be placed in service (Block 1114). While in service, aircraft 1102 may be scheduled for routine maintenance and service (Block 1116). Routine maintenance and service may include modification, reconfiguration, refurbishment, etc. of one or more systems of aircraft 1102.

Each of the processes of service method 1100 may be performed or carried out by a system integrator, a third party, and/or an operator (e.g., a customer). For the purposes of this description, a system integrator may include, without limitation, any number of aircraft manufacturers and major-system subcontractors; a third party may include, without limitation, any number of vendors, subcontractors, and suppliers; and an operator may be an airline, leasing company, military entity, service organization, and so on.

As shown in FIG. 8, aircraft 1102 produced by service method 1100 may include airframe 1118 with a plurality of high-level systems 1120 and interior 1122. Examples of high-level systems 1120 include one or more of propulsion system 1124, electrical system 1126, hydraulic system 1128, and environmental system 1130. Any number of other systems may be included. Although an aerospace example is shown, the principles disclosed herein may be applied to other industries, such as the automotive industry. Accordingly, in addition to aircraft 1102, the principles disclosed herein may apply to other vehicles, e.g., land vehicles, marine vehicles, space vehicles, etc.

System(s) and method(s) shown or described herein may be employed during any one or more of the stages of the manufacturing and service method 1100. For example, components or subassemblies corresponding to component and subassembly manufacturing (block 1108) may be fabricated or manufactured in a manner similar to components or subassemblies produced while aircraft 1102 is in service (Block 1114). Also, one or more examples of the system(s) and method(s), or combination thereof may be utilized during production stages component and subassembly manufacturing (Block 1108) and system integration (Block 1110), for example, by substantially expediting assembly of or reducing the cost of aircraft 1102. Similarly, one or more examples of the system or method realizations, or a combination thereof, may be utilized, for example and without limitation, while aircraft 1102 is in service (Block 1114) and/or during maintenance and service (Block 1116).

Different examples of the system(s) and method(s) disclosed herein include a variety of components, features, and functionalities. It should be understood that the various examples of the system(s) and method(s) disclosed herein may include any of the components, features, and functionalities of any of the other examples of the system(s) and method(s) disclosed herein in any combination, and all of such possibilities are intended to be within the scope of the present disclosure.

Many modifications of examples set forth herein will come to mind to one skilled in the art to which the present disclosure pertains having the benefit of the teachings presented in the foregoing descriptions and the associated drawings.

Therefore, it is to be understood that the present disclosure is not to be limited to the specific examples illustrated and that modifications and other examples are intended to be included within the scope of the appended claims. Moreover, although the foregoing description and the associated drawings describe examples of the present disclosure in the context of certain illustrative combinations of elements and/or functions, it should be appreciated that different combinations of elements and/or functions may be provided by alternative implementations without departing from the scope of the appended claims. Accordingly, parenthetical reference numerals in the appended claims are presented for illustrative purposes only and are not intended to limit the scope of the claimed subject matter to the specific examples provided in the present disclosure.

What is claimed is:

1. A method for manufacturing a composite structure, the method comprising:
   localized heating a portion of a tool to yield a heated portion of the tool;
   mechanically manipulating the heated portion of the tool to change a shape of the tool from an initial shape to a reconfigured shape by engaging a shaping machine with the tool, wherein the shaping machine comprises at least one automated shaping member independently movable about a longitudinal axis, a vertical axis and a traverse axis;
   positioning composite material on an outside surface of the tool to yield a composite layup;
   positioning a vacuum bag into engagement with the composite layup;
   picking up the composite layup;
   mechanically manipulating the heated portion of the tool to change a shape of the tool from the reconfigured shape to another reconfigured shape by engaging the shaping machine with the tool; and
   positioning another composite material on an outside surface of the tool having the another reconfigured shape to yield another composite layup.

2. The method of claim 1, further comprising:
   coupling a vacuum source with the vacuum bag; and
   drawing a vacuum from the vacuum bag.

3. The method of claim 1, wherein the shaping machine comprises a plurality of the automated shaping members.

4. The method of claim 3, wherein the plurality of automated shaping members are automated by computer numerical control.

5. The method of claim 1, wherein the composite material comprises a pre-impregnated thermoset composite material.

6. The method of claim 1, wherein the tool comprises a monolithic, air-impermeable structure.

7. The method of claim 1, wherein the tool comprises a material that is rigid at temperatures below about 150° F. and flexible at temperatures at and above about 150° F.

8. The method of claim 1, wherein the positioning of the vacuum bag comprises placing a flow media layer and an impermeable layer over the composite layup.

9. The method of claim 1, wherein the picking up of the composite layup is performed using vacuum draw.

10. The method of claim 1, wherein the localized heating is performed using a shaping machine comprising a plurality of independently controllable heat sources.

11. The method of claim 1, wherein the shaping of the tool is automated using computer numerical control.

12. The method of claim 1, wherein the method is performed to form a composite aerospace component.

13. The method of claim 1, wherein the heated portion of the tool comprises less than 25 percent of a total volume of the tool.

14. The method of claim 1, wherein the heated portion of the tool comprises less than 15 percent of a total volume of the tool.

15. The method of claim 1, wherein the localized heating comprises heating to a temperature between about 125° F. and about 200° F.

16. The method of claim 1, wherein the localized heating comprises heating to a temperature between about 140° F. and about 175° F.

17. The method of claim 1, wherein mechanically manipulating the heated portion comprises expanding the heated portion of the tool.

18. The method of claim 3, wherein the composite material comprises a pre-impregnated thermoset composite material.

19. The method of claim 4, wherein the composite material comprises a pre-impregnated thermoset composite material.

20. The method of claim 6, wherein the composite material comprises a pre-impregnated thermoset composite material.

* * * * *